United States Patent
Cunico et al.

(10) Patent No.: US 10,887,272 B2
(45) Date of Patent: *Jan. 5, 2021

(54) AUTOMATIC RESPONSE SYSTEM BASED ON BODY LANGUAGE

(71) Applicant: International Business Machines Corporation, Armonk, NY (US)

(72) Inventors: Hernan A. Cunico, Holly Springs, NC (US); Asima Silva, Holden, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/777,797

(22) Filed: Jan. 30, 2020

(65) Prior Publication Data

US 2020/0169525 A1  May 28, 2020

Related U.S. Application Data

(63) Continuation of application No. 15/429,909, filed on Feb. 10, 2017, now Pat. No. 10,587,565.

(51) Int. Cl.
*G06F 15/16* (2006.01)
*H04L 12/58* (2006.01)
*G06K 9/00* (2006.01)

(52) U.S. Cl.
CPC .......... *H04L 51/34* (2013.01); *G06K 9/00302* (2013.01); *G06K 9/00335* (2013.01); *H04L 51/18* (2013.01); *H04L 51/32* (2013.01)

(58) Field of Classification Search
CPC .......... H04L 51/34; H04L 51/18; H04L 51/32; G06K 9/00302; G06K 9/00335
See application file for complete search history.

(56) References Cited

U.S. PATENT DOCUMENTS 8,166,032 B2   4/2012 Sommer
8,495,503 B2   7/2013 Brown
(Continued)

FOREIGN PATENT DOCUMENTS

JP   2013228847 A   11/2013
WO   2014139118 A1   9/2014

OTHER PUBLICATIONS

"Leveraging Sentiment Analysis on Social Network Comments to Associate a Like," [online] IP.com Prior Art Database Technical Disclosure, Jun. 4, 2015, retrieved from the Internet: <http://ip.com/IPCOM/000241855D>, 3 pg.
(Continued)

*Primary Examiner* — Padma Mundur
(74) *Attorney, Agent, or Firm* — Cuenot, Forsythe & Kim, LLC

(57) ABSTRACT

Content of an electronic message can be presented to a recipient of the electronic messaging. At least one visible user gesture made by the recipient while reviewing the content can be identified using an image capture device. Based on the visible user gesture(s), at least one sentiment of the recipient while reviewing the content can be determined. At least one response indicator can be selected to represent the sentiment(s) of the recipient while reviewing the content. Each response indicator can include a predefined graphic. The response indicator(s) can be inserted into electronic message.

20 Claims, 7 Drawing Sheets

(56) References Cited

U.S. PATENT DOCUMENTS

| | | | |
|---|---|---|---|
| 9,960,932 B2* | 5/2018 | Constantinou | H04L 51/10 |
| 10,587,565 B2 | 3/2020 | Cunico et al. | |
| 2004/0001086 A1 | 1/2004 | Brown | |
| 2009/0282114 A1 | 11/2009 | Feng | |
| 2014/0088944 A1 | 3/2014 | Natarajan | |
| 2014/0139118 A1 | 5/2014 | So | |
| 2014/0152758 A1 | 6/2014 | Tong | |
| 2015/0046371 A1 | 2/2015 | Leary | |
| 2015/0062318 A1* | 3/2015 | Wexler | H04W 4/029 |
| | | | 348/77 |
| 2015/0121251 A1 | 4/2015 | Kadirvel | |
| 2015/0206000 A1* | 7/2015 | el Kaliouby | H04L 51/02 |
| | | | 382/118 |
| 2015/0220774 A1 | 8/2015 | Ebersman | |
| 2015/0248622 A1 | 9/2015 | Myslinski | |
| 2015/0350125 A1 | 12/2015 | Henderson | |
| 2016/0063993 A1 | 3/2016 | Dolan | |
| 2016/0203360 A1* | 7/2016 | Alvarez | G06F 3/04845 |
| | | | 345/156 |
| 2016/0370975 A1* | 12/2016 | Collins | G06F 3/04883 |
| 2017/0038847 A1* | 2/2017 | Schorsch | G06F 3/0346 |
| 2018/0234382 A1 | 8/2018 | Cunico et al. | |

OTHER PUBLICATIONS

"Sharing/Unsharing Social Media Content Based on Analyzing Sentiment Directed to Specific Users Within That Content," [online] IP.com Prior Art Database Technical Disclosure, Apr. 17, 2015, retrieved from the Internet: <http://ip.com/IPCOM/000241336D>, 3 pg.

Pantic, M., "Facial Expression Recognition," In Encyclopedia of Biometrics, pp. 400-406, Springer US.

Feijo, F.J. et al., "Enabling Continuous Emotional Status Display in Mobile Text Chat," In 7th Int'l. Conf. on Social Computing and Social Media, SCSM 2015, LNCS 9182, Aug. 2, 2015, pp. 12-19, Springer International Publishing.

IBM; List of IBM Patents or Patent Applications Treated as Related, 2 pg.

Cunico, H. et al., "Automatic Response System Based on Body Language," U.S. Appl. No. 15/429,909, filed Feb. 10, 2017, 42 pages. (A copy isn not provided as this application is available to the Examiner.

* cited by examiner

AUTOMATIC RESPONSE SYSTEM BASED ON BODY LANGUAGE

BACKGROUND

The present invention relates to data processing systems, and more specifically, to data processing systems that send and receive electronic messages.

Electronic mail (e-mail) tracking is a method for monitoring delivery of e-mails to intended recipients. Most e-mail tracking technologies use a time-stamped record which indicates the exact time and date that an email was received or opened, as well the IP address of the recipient. E-mail tracking is a useful way for senders of e-mail to know whether intended recipients of e-mail actually received and/or opened the e-mail.

Typically, to activate e-mail tracking, a sender of an e-mail can select one or more menu items presented in an e-mail client application used to generate the e-mail. For example, before sending an e-mail, the sender can select a menu item to request a delivery receipt and/or select a menu item to request a read receipt. Such requests can be processed by an e-mail server and/or e-mail client used by the e-mail recipient to generate the receipts and communicate the receipts to the e-mail sender.

SUMMARY

A method includes presenting content of an electronic message to a recipient of the electronic message. The method also can include identifying, using a first image capture device, a first visible user gesture made by the first recipient while reviewing a first portion of the content of the electronic message and identifying, using the first image capture device, at least a second visible user gesture made by the first recipient while reviewing at least a second portion of the content of the electronic message. The method also can include, based on the first visible user gesture, determining, using a processor, a first sentiment of the first recipient while reviewing the first portion of the content of the electronic message and determining a second sentiment of the first recipient while reviewing the second portion of the content of the electronic message. The method also can include selecting a first response indicator to represent the first sentiment of the first recipient while reviewing the first portion of the content of the electronic message, the first response indicator comprising a first predefined graphic, and selecting a second response indicator to represent the second sentiment of the first recipient while reviewing the second portion of the content of the electronic message, the second response indicator comprising a second predefined graphic. The method also can include inserting into the electronic message the first response indicator and the second response indicator, and configuring the electronic message to present the first response indicator proximate to the first portion of the content of the electronic message for which the first sentiment is determined and configuring the electronic message to present the second response indicator proximate to the second portion of the content of the electronic message for which the second sentiment is determined.

A system includes a processor programmed to initiate executable operations. The executable operations include presenting content of an electronic message to a recipient of the electronic message. The executable operations also can include identifying, using a first image capture device, a first visible user gesture made by the first recipient while reviewing a first portion of the content of the electronic message and identifying, using the first image capture device, at least a second visible user gesture made by the first recipient while reviewing at least a second portion of the content of the electronic message. The executable operations also can include, based on the first visible user gesture, determining a first sentiment of the first recipient while reviewing the first portion of the content of the electronic message and determining a second sentiment of the first recipient while reviewing the second portion of the content of the electronic message. The executable operations also can include selecting a first response indicator to represent the first sentiment of the first recipient while reviewing the first portion of the content of the electronic message, the first response indicator comprising a first predefined graphic, and selecting a second response indicator to represent the second sentiment of the first recipient while reviewing the second portion of the content of the electronic message, the second response indicator comprising a second predefined graphic. The executable operations also can include inserting into the electronic message the first response indicator and the second response indicator, and configuring the electronic message to present the first response indicator proximate to the first portion of the content of the electronic message for which the first sentiment is determined and configuring the electronic message to present the second response indicator proximate to the second portion of the content of the electronic message for which the second sentiment is determined.

A computer program product includes a computer readable storage medium having program code stored thereon, the program code executable by a data processing system to initiate operations. The operations include presenting content of an electronic message to a recipient of the electronic message. The operations also can include identifying, using a first image capture device, a first visible user gesture made by the first recipient while reviewing a first portion of the content of the electronic message and identifying, using the first image capture device, at least a second visible user gesture made by the first recipient while reviewing at least a second portion of the content of the electronic message. The operations also can include, based on the first visible user gesture, determining a first sentiment of the first recipient while reviewing the first portion of the content of the electronic message and determining a second sentiment of the first recipient while reviewing the second portion of the content of the electronic message. The operations also can include selecting a first response indicator to represent the first sentiment of the first recipient while reviewing the first portion of the content of the electronic message, the first response indicator comprising a first predefined graphic, and selecting a second response indicator to represent the second sentiment of the first recipient while reviewing the second portion of the content of the electronic message, the second response indicator comprising a second predefined graphic. The operations also can include inserting into the electronic message the first response indicator and the second response indicator, and configuring the electronic message to present the first response indicator proximate to the first portion of the content of the electronic message for which the first sentiment is determined and configuring the electronic message to present the second response indicator proximate to the second portion of the content of the electronic message for which the second sentiment is determined.

DETAILED DESCRIPTION

This disclosure relates to data processing systems, and more specifically, to data processing systems that send and receive electronic messages. In accordance with the inventive arrangements disclosed herein, content of an electronic message can be presented to a recipient of the electronic messaging. An image capture device can be used to capture images of the recipient and generate corresponding image data. The image data can be processed to identify at least one visible user gesture made by the recipient while reviewing the content. Based on the visible user gesture(s), at least one sentiment of the recipient while reviewing the content can be determined. Further, at least one response indicator can be selected to represent the sentiment(s) of the recipient while reviewing the content. The response indicator(s) can be communicated to a sender of the electronic message. The response indicator(s) can indicate to the sender the sentiment(s) of the recipient while reviewing the content.

Figure 1:
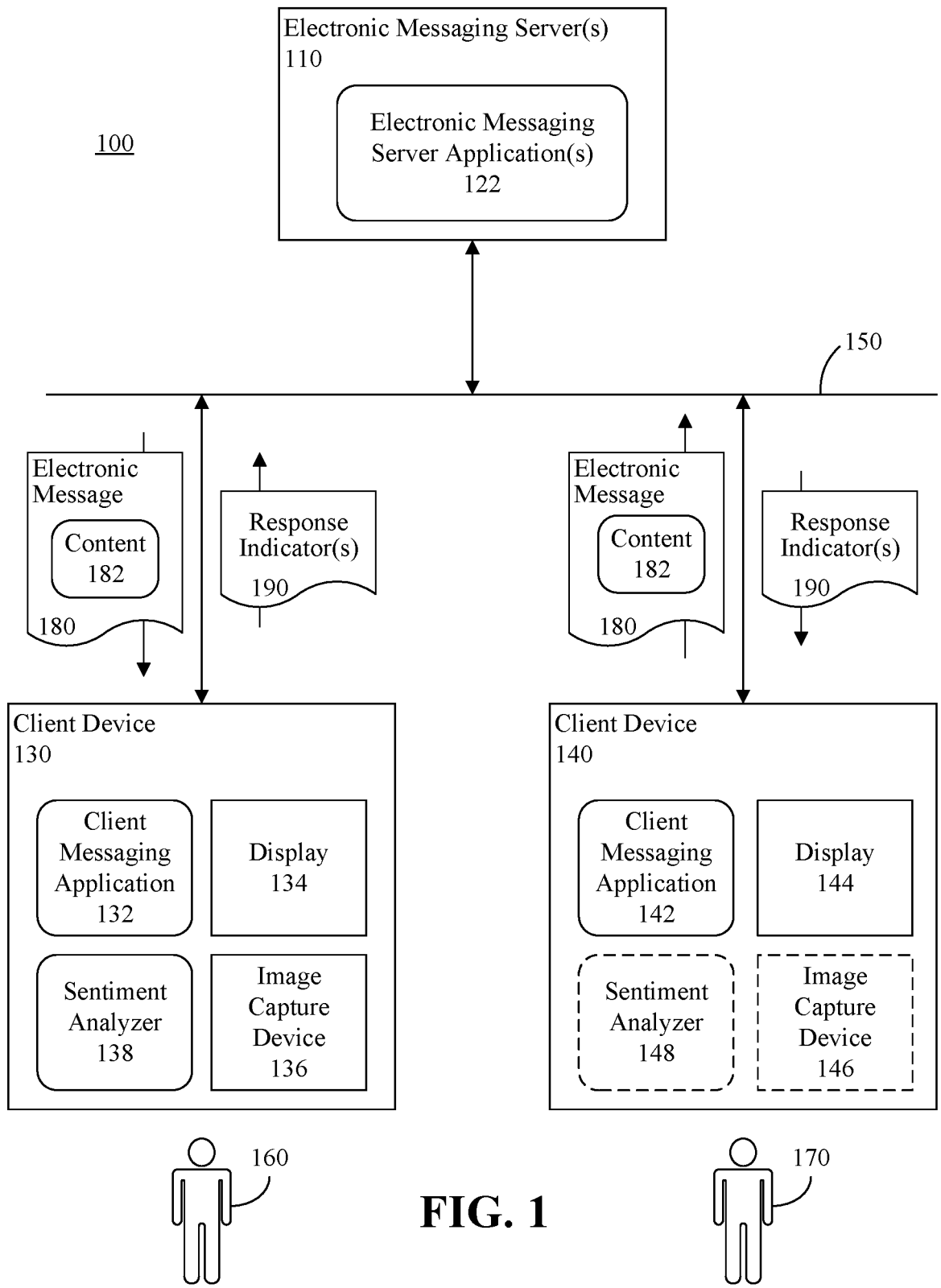
FIG. 1 is a block diagram illustrating an example of a computing environment.

FIG. 1 is a block diagram illustrating an example of a computing environment 100. The computing environment 100 can include one or more electronic messaging servers 110. Each electronic messaging server 110 can include (e.g., host) at least one electronic messaging server application 122. Examples of an electronic messaging server application 122 include, but are not limited to, an electronic mail (e-mail) server application, a text messaging server application, an instant messaging server application, a social networking service and a web based forum.

The computing environment 100 also can include a plurality of client devices 130, 140 communicatively linked to the electronic messaging server(s) 110 via at least one communication network 150. The communication network 150 is the medium used to provide communications links between various devices and data processing systems connected together within the computing environment 100. The communication network 150 may include connections, such as wire, wireless communication links, or fiber optic cables. The communication network 150 can be implemented as, or include, any of a variety of different communication technologies such as a WAN, a LAN, a wireless network, a mobile network, a Virtual Private Network (VPN), the Internet, the Public Switched Telephone Network (PSTN), or similar technologies.

Each client device 130, 140 can include a respective client messaging application 132, 142 configured to send and receive electronic messages. Examples of a client messaging application 132, 142 include, but are not limited to, an e-mail client application, a text messaging client application, an instant messaging client application, a mobile application and a web browser. For example, using a mobile application or web browser, a client device 130, 140 can access electronic messaging services provided by the electronic messaging server application(s) 122. Each client device 130, 140 can include a respective display 134, 144. Each display 134, 144 can be integrated in to the respective client device 130, 140 or communicatively linked to the respective client device 130, 140.

The client device 130 further can include an image capture device 136 configured to capture images of a user 160 using the client device 130 and generate corresponding image data. The image capture device 136 can be, for example, a camera integrated with the client device 130 or a camera communicatively linked to the client device 130.

The client device 130 also can include a sentiment analyzer 138. In one arrangement, the sentiment analyzer 138 can be implemented as an application executed by the client device 130. In another arrangement, the sentiment analyzer 138 can be implemented as a plug-in to the client messaging application 132. In yet another arrangement, the sentiment analyzer 138 can be an application executed by the electronic messaging server 110 or a plug-in to the electronic messaging server application 122.

The sentiment analyzer 138 can be configured process image data generated by the image capture device 136 and, based on processing the image data, monitor visible user gestures made by the user 160. Specifically, the sentiment analyzer 138 can monitor body language of the user 160, such as facial expressions of the user 160, body posture of the user 160, appendage movement of the user 160, eye movement of the user 160 and use of space by the user 160. Based on the visible user gestures made by the user 160, the sentiment analyzer 138 can determine at least one sentiment of the user 160 and select a corresponding response indicator to represent the sentiment.

Optionally, the client device 140 can include an image capture device 146 and/or sentiment analyzer 148. The image capture device 146 can be configured to capture images of the user 170 and the sentiment analyzer 148 can be configured to determine sentiments of the user 170 and select response indicators, for example as previously described with respect to the image capture device 136 and the sentiment analyzer 138.

Figure 2:
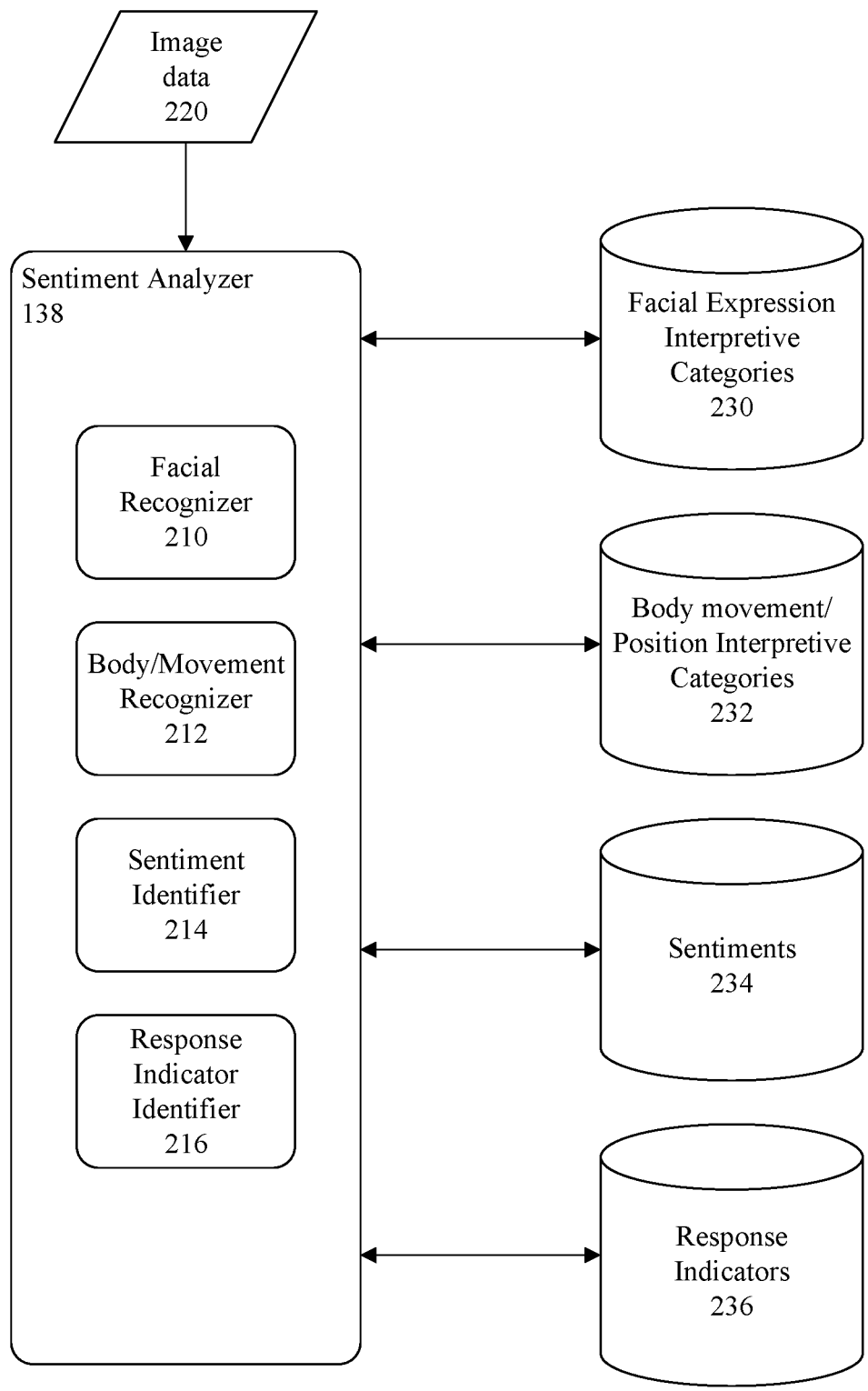
FIG. 2 is a block diagram illustrating an example architecture of a sentiment analyzer.

FIG. 2 is a block diagram illustrating an example architecture of the sentiment analyzer 138. The sentiment analyzer 138 can include a facial recognizer 210, body/movement recognizer 212, a sentiment identifier 214 and a response indicator identifier 216. To monitor visible user gestures made by the user 160, the sentiment analyzer 138 can identify one or more visible user gestures in the image data 220 generated by the image capture device 136 (FIG. 1) for the captured images. To identify the visible user gestures, the sentiment analyzer 138 can perform analysis on facial characteristics and/or body movements of the user 160 indicated in the image data 220 using techniques known to those skilled in the art. For example, the facial recognizer 210 can implement facial expression recognition, which may include identifying facial features in a detected face region, analyzing the motion of facial features and/or changes in the appearance of facial features, and classifying this information into a facial expression interpretive category. The body/movement recognizer 212 can implement body movement/position recognition, which may include identifying various body parts, analyzing motion and/or position of the body parts, and classifying this information into a body movement/position interpretive category. Facial expression interpretive categories 230 and body movement/position interpretive categories 232 can be defined in one or more suitable functional data structures, for example in one or more data tables of one or more data bases.

Based on at least one interpretive category 230, 232 to which the visible user gestures made by the user 160 are assigned, the sentiment identifier 214 can determine at least one sentiment 234 of the user 160. In illustration, the sentiment identifier 214 can access one or more functional data structures, for example in one or more data tables of one or more data bases, that correlate facial expression interpretive categories 230 and/or body movement/position interpretive categories 232 to sentiments 234 corresponding to the interpretive categories 230, 232. For instance, a data table can include a plurality of records, and each record can include a field for a facial expression interpretive category 230, a field for a body movement/position interpretive category 232, and a field for a sentiment 234. Responsive to classifying a visible user gesture into an interpretive category 230, 232, the sentiment analyzer 138 can identify a sentiment 234 indicated in a record that indicates the interpretive category 230, 232.

In one arrangement, the sentiments 234 can be represented in the functional data structure as sentiment values representing various sentiments and degrees of sentiment. In illustration, 0 can represent a very negative sentiment (e.g. disagreement), 5 can represent a neutral or undetermined sentiment, and 10 can represent a very positive sentiment (e.g., agreement). Numbers from 1 to 4 can represent varying degrees of negative sentiment between very negative and neutral, and numbers from 6 to 9 can represent varying degrees of positive sentiment between neutral and vary positive. In another example, 0 can represent a very sad sentiment, 5 can represent a neutral or undetermined sentiment, and 10 can represent a very happy sentiment (e.g., laughter). Numbers from 1 to 4 can represent varying degrees of a sad sentiment between very sad and neutral, and numbers from 6 to 9 can represent varying degrees of a happy sentiment between neutral and vary happy. Numbers also can be used to represent levels of confusion, levels of understanding, levels of approval, levels of disapproval, levels of disappointment, etc. In a further arrangement, sentiments can be categorized into a negative/positive category, a sad/happy category, confusion/understanding category, approval/disapproval category, or any other type of category. In this regard, sentiments can be quantified and categorized (or qualified).

The response indicator identifier 216 can be configured to select response indicators 236 representing various determined sentiments 234. In illustration, the response indicator identifier 216 can access one or more functional data structures, for example in one or more data tables of one or more data bases, which correlate sentiments 234 to response indicators 236. For instance, a data table can include a plurality of records, and each record can include a field for a sentiment 234 (e.g., a sentiment value representing a particular sentiment), a field for a category of sentiment, and a field for a response indicator 236 representing the sentiment 234 (and/or a field for indicating a color or color gradient). In this regard, each response indicator 236 can include a predefined graphic, such as an icon, emoji, emoticon or picture. In addition to, or in lieu of, the predefined graphic, each response indicator 134 can be represented by a color or color gradient. Responsive to determining a sentiment 234, the response indicator identifier 218 can identify a link to a response indicator 236 indicated in a record that indicates the determined sentiment 234, and access the response indicator 236 using that link. In an arrangement in which the response indicator identifier 218 further includes a color or color gradient, the response indicator identifier 218 can identify a color or color gradient indicated in a record that indicates the determined sentiment 234, and identify that color or color gradient.

The functional data structures discussed above can be stored on the client device 130, the electronic messaging server(s) 110, or one or more other data processing systems (not shown) to which the client device 130 is communicatively linked.

Referring again to FIG. 1, in operation, the user 170 (e.g., sender) can generate and communicate an electronic message 180. For example, via the client messaging application 142, the user 170 can generate an e-mail or a text message and communicate the e-mail or text message to the user 160. In another arrangement, via the client messaging application 142, the user 170 can generate a post in a social networking service or web based forum, wherein the post is configured to be shared with the user 160.

The user 160 (e.g., recipient) can access the electronic message 180 using the client messaging application 132. For example, the user 160 can open the e-mail or text message, or navigate to the post in the social networking service or web based forum. Responsive to the user 160 accessing the electronic message 180, the client messaging application 132 can present to the user 160, on the display 134, content 182 of the electronic message 180, and the user 160 can review (e.g., read) the electronic message 180.

As the user 160 reviews the content 182 of the electronic message 180, the image capture device 136 can capture images (e.g., video or a series of still images) of the user 160. In illustration, the client messaging application 132 or the sentiment analyzer 138 can initialize the image capture device 136 to begin capturing images of the user 160 responsive to the content 182 being presented by the client messaging application 132 on the display 134. As the image capture device 136 captures the images, the image capture device 136 can generate, in real time, the image data 220 (FIG. 2), and communicate the image data 220 to the sentiment analyzer 138 in real time. The sentiment analyzer 138 can process the image data 220 to identify, in real time, at least one user gesture made by the user 160, for example as previously described, while reviewing the content 182 of the electronic message 180.

In one arrangement, the sentiment analyzer 138 can process the image data 220 (e.g., using the facial recognizer 210 or another suitable component) to determine which portion of the content 182 of the electronic message 180 the user 160 is reviewing at any particular moment. For example, the sentiment analyzer 138 can process the image data 220 to determine where on the display 134 the user 160 is gazing at any particular moment, and interface with the client messaging application 132 to determine which portion of the content 182 of the electronic message 180 is being presented in the location of the display 134 where the user 160 is gazing at that moment. Accordingly, the sentiment analyzer 138 can monitor various visible user gestures made by the user 160 while reviewing different portions of the content 182.

Based on the visible user gesture(s) made by the user 160 while reviewing the content 182, the sentiment analyzer 138 can determine, in real time, at least one sentiment of the user 160 while reviewing the content 182, for example as previously described. Based on the determined sentiment(s), the sentiment analyzer 138 can select, in real time, at least one response indicator 190 to represent the sentiment(s) of the user 160 toward the content 182, for example as previously described. As noted, the response indicator can include a predefined graphic and/or a color or color gradient.

Further, the sentiment analyzer 138 can communicate, in real time, the response indicator(s) 190 to the user 170. The response indicator(s) 190 can indicate to the user 170 the sentiment of the user 160 toward the content 182 of the electronic message 180. For example, the response indicator(s) 190 can indicate agreement with the content 182, disagreement with the content 182, disappointment with the content 182, anger toward the content 182, happiness with the content 182, confusion about the content 182, understanding of the content 182, happiness toward the content 182, humor toward the content 182, etc. Moreover, the response indicator(s) 190 can indicate a level of agreement with the content 182, a level of disagreement with the content 182, a level of disappointment with the content 182, a level of anger toward the content 182, a level of confusion about the content 182, a level of understanding of the content 182, a level of happiness with the content 182, a level of humor toward the content 182, and so on.

In one aspect of the present arrangements, the client messaging application 132 can prompt the user 160 to confirm whether the user 160 approves the at least one response indicator(s) 190 prior to the response indicator(s) 190 being communicated to the user 170. In illustration, responsive to the sentiment analyzer 138 selecting a response indicator 190, the client messaging application 132 can present a message (e.g., a pop up message) to the user 160. The message can present the response indicator 190 can at least one button (or icon, menu item, etc.) selectable by the user 160. Responsive to the user selecting the button, the client messaging application 132 can communicate the response indicator 190 to the user 170.

In an arrangement in which the electronic message 180 is an e-mail, communicating the response indicator(s) 190 to the user 170 can include inserting the response indicator(s) 190 into the e-mail. In illustration, in response to selecting the response indicator(s) 190, the sentiment analyzer 138 can initiate the client messaging application 132 to communicate the response indicator(s) 190 to the electronic messaging server application 122, and the electronic messaging server application 122 can insert the response indicator(s) 190 into a copy of the electronic message 180 stored by the electronic messaging server application 122. Further, the electronic messaging server application 122 can update copies of the electronic message 180 stored by the client messaging applications 132, 142 by replacing those copies with the version of the electronic message 180 having the inserted response indicator(s) 190.

In another arrangement, the sentiment analyzer 138 can initiate the client messaging application 132 to communicate the response indicator(s) 190 to the client messaging application 142, and the client messaging application 142 can be configured to insert the response indicator(s) 190 into a copy of the electronic message 180 stored by the client messaging application 142. Further, the client messaging application 132 can insert the response indicator(s) 190 into a copy of the electronic message 180 stored by the client messaging application 132.

In another arrangement, the response indicator(s) 190 can be communicated to the user 170 in another e-mail generated in response to the electronic message 180. In illustration, in response to selecting the response indicator(s) 190, the sentiment analyzer 138 can initiate the client messaging application 132 to generate a response e-mail, insert into the response e-mail the response indicator(s) 190, and communicate the response e-mail to the user 170.

Figure 3:
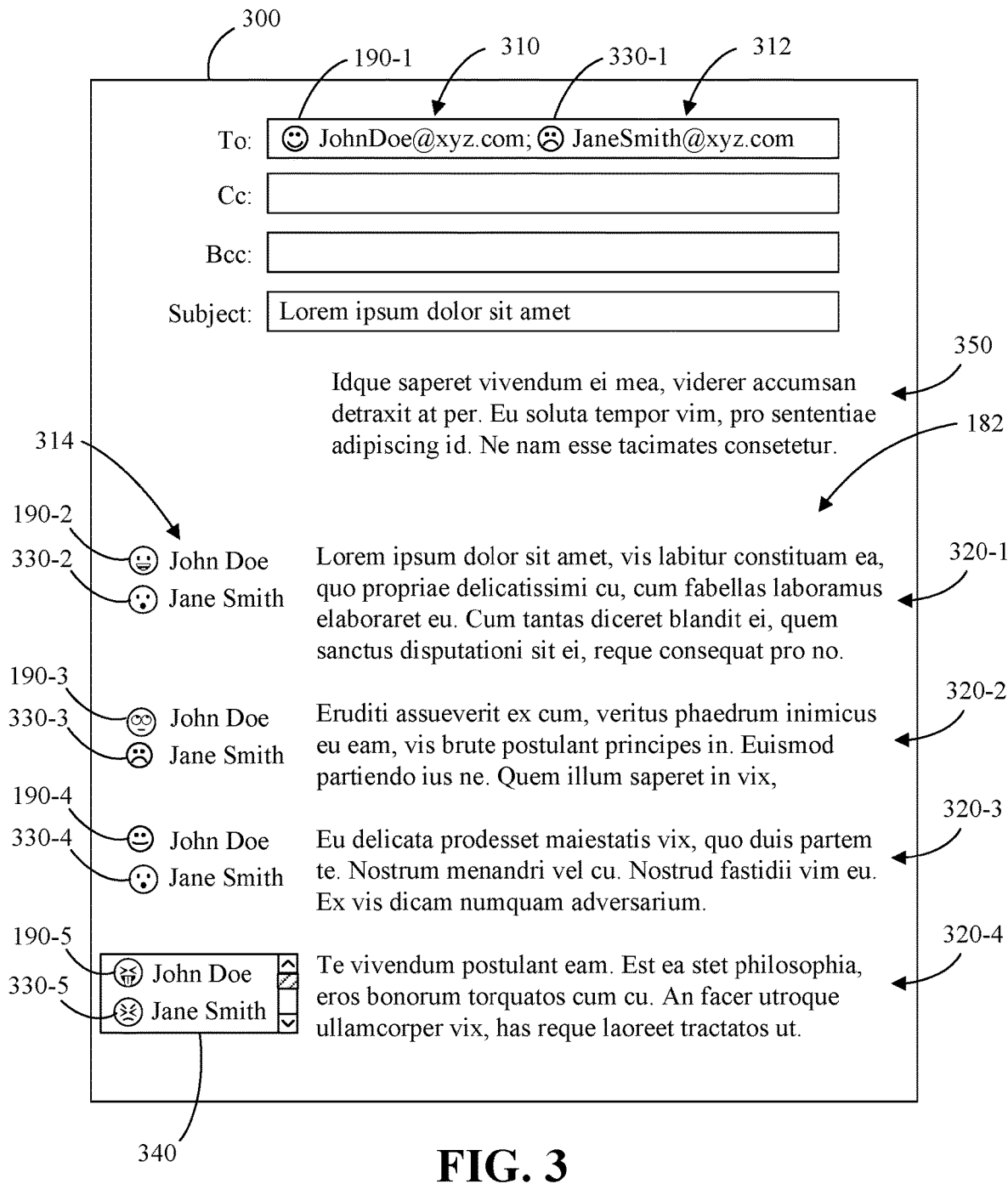
FIG. 3 is an example view of an electronic message presented by a user interface of a client messaging application.

FIG. 3 is an example view 300 of an electronic message 180 presented by a user interface of a client messaging application, for example the client messaging application 142 and, optionally, the client messaging application 132 of FIG. 1. In this example, the electronic message 180 can be an e-mail. Referring to FIG. 1 and FIG. 3, the view 300 can present user identifiers 310, 312 indicating recipients of the electronic message 180 and the content 182 of the electronic message 180. The identifiers 310, 312 can be presented in a recipient identifier field (e.g., a "To" field) of the e-mail.

The electronic messaging server application 122, client messaging application 142 and/or client messaging application 132 can insert a response indicator 190-1 into the electronic message 180 in a manner that configures the response indicator 190-1 to be presented in the view 300 proximate to the user identifier 310 indicating the user 160 for whom the sentiment represented by the response indicator 190-1 is determined. For example, the response indicator 190-1 can be presented in a "To" field of the view 300 next to the user identifier 310. Accordingly, the view 300 can present to the user 170 the response indicator 190-1 when the user 170 is presented the view 300. Further, the view 300 can present to the user 160 the response indicator 190-1 when the user 160 is presented the view 300.

In this example, the content 182 can include a plurality of content portions 320-1, 320-2, 320-3, 320-4. In one arrangement, the sentiment analyzer 138 can select a plurality of responsive indicators 190-1, 190-2, 190-3, 190-4, 190-5. In illustration, the sentiment analyzer 138 can determine a respective sentiment of the user 160 toward each of a plurality of portions 320-1, 320-2, 320-3, 320-4 of the content 182, and select a response indicator 190-2, 190-3, 190-4, 190-5 for each determined sentiment. The electronic messaging server application 122, client messaging application 142 and/or client messaging application 132 can insert the response indicators 190-2, 190-3, 190-4, 190-5 into the electronic message 180 in a manner that configures the response indicators 190-2, 190-3, 190-4, 190-5 to be presented proximate to the respective portions 320-1, 320-2, 320-3, 320-4 of the content 182 for which the respective sentiments are determined. In this regard, the response indicator 190-2 can represent a sentiment of the user 160 toward the portion 320-1 of content 182, the response indicator 190-3 can represent a sentiment of the user 160 toward the portion 320-2 of content 182, the response indicator 190-4 can represent a sentiment of the user 160 toward the portion 320-3 of content 182, and the response indicator 190-5 can represent a sentiment of the user 160 toward the portion 320-4 of content 182. The view 300 can present to the user 170 each of the response indicators 190-2, 190-3, 190-4, 190-5 when the user 170 is presented the view 300. Further, the view 300 can present to the user 160 each of the response indicators 190-2, 190-3, 190-4, 190-5 when the user 160 is presented the view 300.

In one non-limiting arrangement, optionally, the view 300 can present a user identifier 314 proximate to each of the response indicators 190-2, 190-3, 190-4, 190-5. The user identifiers 314 can indicate the user 160 for whom the response indicators 190-2, 190-3, 190-4, 190-5 are selected. The user identifiers 314 can be presented, for example, if there is more than one recipient of the electronic message 180. Accordingly, the user 170 can be appraised of the user 160 for whom the response indicators 190-2, 190-3, 190-4, 190-5 are selected. If there is only one recipient of the electronic message 180, the user identifiers 314 need not be, though can be, presented.

In one aspect, the response indicator 190-1 can be a summary response indicator representing a summary of the sentiments of the user 160 toward the content 182. As noted, each sentiment can be represented by a sentiment value. The sentiment analyzer 138 can average the sentiment values representing the sentiments determined for the respective portions 320-1, 320-2, 320-3, 320-4 of the content 182, and select the response indicator 190-1 to be a response indicator corresponding to an average of the sentiment values.

The electronic message 180 can be sent to, and reviewed by, a plurality of recipients. Thus, in addition to the response indicator(s) 190, the view 300 also can present response indicators 330-1, 330-2, 330-3, 330-4, 330-5 selected for one or more of the other recipients based on their determined sentiments when reviewing the content 182 of electronic message 180. The response indicators 330-1, 330-2, 330-3, 330-4, 330-5 can be selected by respective sentiment analyzers executing on client devices used by such other recipients or by a sentiment analyzer executing on the electronic messaging server 110 and presented in a manner similar to that described for the response indicators 190.

In the case that a listing of recipients for whom response indicators are selected for any particular portion of the content 182, for example the portion 320-4, would extend vertically in the view 300 beyond an extent that text of the portion 320-4 extends, a listing of the recipients and response indicators 190-5, 330-5, etc. can be presented in a scroll box 340. Thus, the listing need not overlap with listings for other portions 320-1, 320-2, 320-3. The user 170 can use the scroll box 340 to scroll through the listing.

In one aspect of the present arrangements, in response to the response indicator(s) 190 being inserted into the electronic message 180, the client messaging application 142 can alert the user 170 of such circumstance. For example, the client messaging application 142 and/or electronic messaging server application 122 can present a pop up message, or an e-mail message, indicating that the electronic message 180 has been reviewed and indicating sentiments of one or more recipients toward the content 182. In another aspect, the client messaging application 132 and/or electronic messaging server application 122 can generate a response e-mail including the content 182 and the response indicator(s) 190, and communicate the response e-mail to the client messaging application 142.

In another aspect of the present arrangements, for example in an arrangement in which the user 170 requests a deliver receipt and/or read receipt for the electronic message 180, the client messaging application 132 and/or electronic messaging server application 122 can automatically include in the a deliver receipt and/or read receipt the content 182 of the electronic message 180 and the response indicator(s) 190.

In yet another aspect of the present arrangements, the client messaging application 132 and/or electronic messaging server application 122 can automatically generate a response electronic message responding to the electronic message 180. The response electronic message can include the content 182 of the electronic message 180 and the response indicator(s) 190.

Further, the client messaging application 132 and/or electronic messaging server application 122 can insert into the electronic message 180 predefined text 350 selected based on the average of the sentiment values, for example sentiment values used to select the respective response indicators 190-2, 190-3, 190-4, 190-5 and/or 330-2, 330-3, 330-4, 330-5. In illustration, predefined text can be stored in one or functional data structures that correlates each predefined text with a particular value. Each value can be a value that can be determined as an average of the sentiment values. The client messaging application 132 and/or electronic messaging server application 122 can, responsive to the sentiment analyzer 138 determining an average of the sentiment values, access the functional data structure to retrieve the corresponding predefined text 350.

In one arrangement, the predefined text 350 can correspond to an average of the sentiment values for all users who have reviewed the content 182. In another arrangement, the predefined text 350 can correspond to an average of the sentiment values determined for the user 160, and thus represent an average sentiment of the user 160. Further, the client messaging application 132 and/or electronic messaging server application 122 can insert into the electronic message 180 additional predefined text (not shown) representing average sentiment(s) of one or more other users. In such arrangements, the client messaging application 132 and/or electronic messaging server application 122 also can insert into the electronic message 180, for example proximate to the predefined text 350, a user indicator indicating for which user's average sentiment the predefined text 350 is selected.

Figure 4:
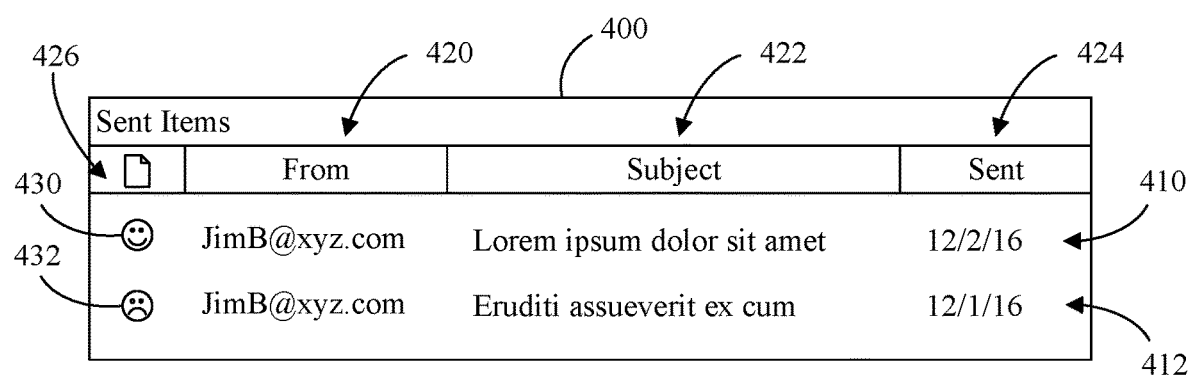
FIG. 4 is an example view of an electronic message listing presented by a user interface of a client messaging application.

FIG. 4 is an example view 400 of an electronic message listing presented by a user interface of a client messaging application, for example the client messaging application 142 and, optionally, the client messaging application 132 of FIG. 1. In this example, the electronic message 180 can be an e-mail. Referring to FIG. 1 and FIG. 4, the view 400 can present one or message indicators 410, 412, for example records, representing electronic messages that have been sent by the user 170. The message indicators 410, 412 can be presented in a sent items folder, an inbox folder, or any other suitable folder of the client messaging application 142 and, optionally, the client messaging application 132.

The message indicator 410 can represent the electronic message 180, and the message indicator 412 can represent another electronic message sent by the user 170. Each message indicator 410, 412 can include a plurality of fields, for example a field 420 indicating who sent the respective electronic message, a field 422 indicating a subject of the respective electronic message, and a field 424 indicating when the respective electronic message was sent or received by at least one recipient. In addition, each message indicator 410, 412 can include a field in which response indicators are presented. For example, the field 426 for the message indicator 410 can present a response indicator 430 and the field 426 for the message indicator 412 can present a response indicator 432. The electronic messaging server application 122, client messaging application 142 and/or client messaging application 132 can select the response indicators and insert the response indicators 430, 432 into the electronic message 180 in a manner that configures the response indicators 430, 432 to be presented in the view 400 in the fields 426.

In an example in which the message indicator 410 represents the electronic message 180, the response indicator 430 can be, for example, the response indicator 190-1 of FIG. 3. In an arrangement in which the electronic message 180 is sent to a plurality of recipients, the response indicator 430 can be selected to represent a summary of sentiments determined for all recipients who have reviewed the electronic message 180. In illustration, sentiment values assigned to all sentiments determined for respective portions of the content 182 can be averaged, and the response indicator 430 can be selected based on the resulting average of the sentiment values. The response indicator 432 can be selected in a similar manner for an electronic message represented by the message indicator 412.

Figure 5:
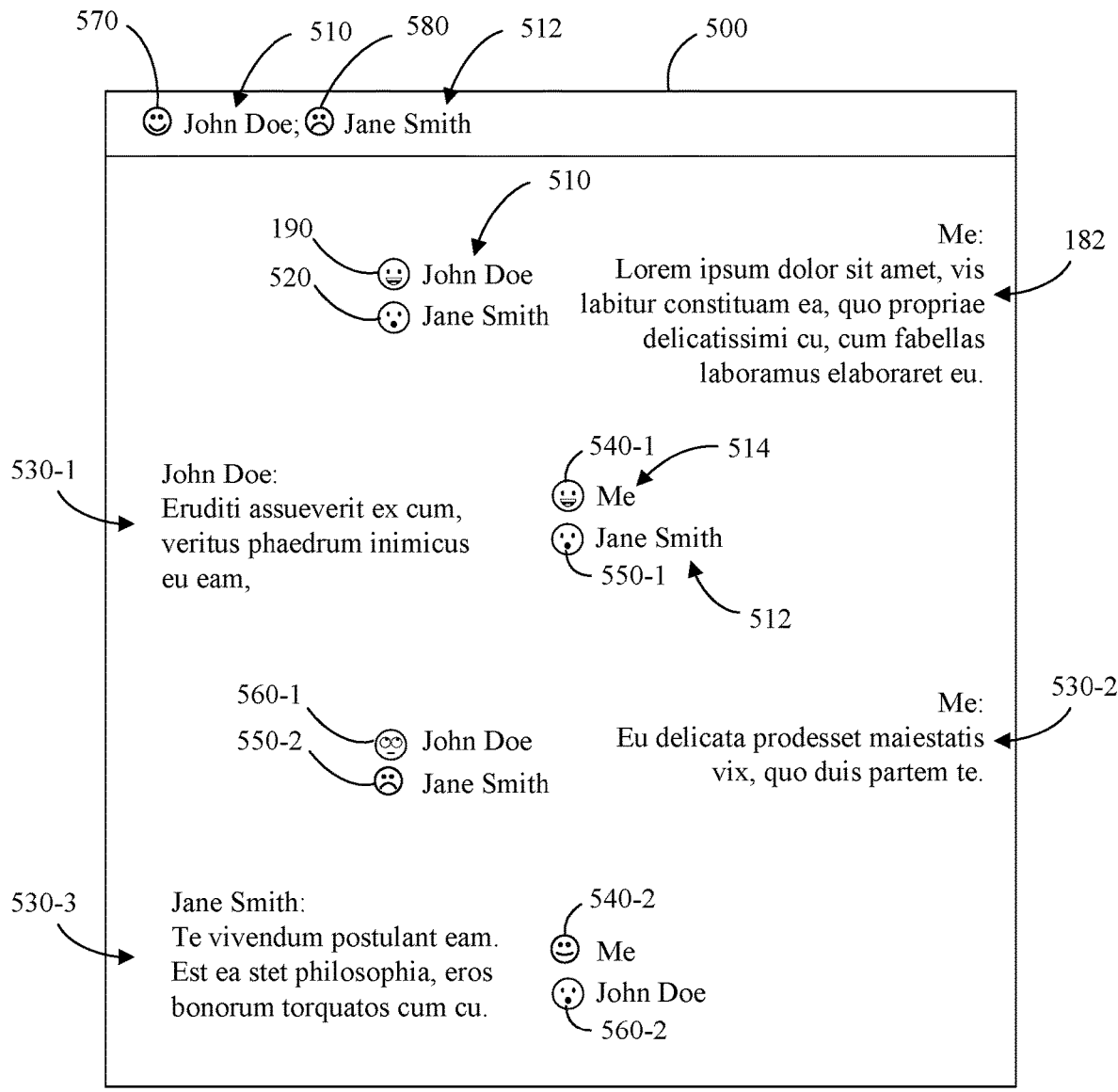
FIG. 5 is another example view of an electronic message presented by a user interface of a client messaging application.

FIG. 5 is another example view 500 of an electronic message 180 presented by a user interface of a client messaging application, for example the client messaging application 142 and, optionally, the client messaging application 132 of FIG. 1. In this example, the electronic message 180 can be a text message. Referring to FIG. 1 and FIG. 5, the view 500 can present user identifiers 510, 512 indicating recipients of the electronic message 180 and the content 182 of the electronic message 180.

The electronic messaging server application 122, client messaging application 142 and/or client messaging application 132 can insert a response indicator 190 into the electronic message 180 in a manner that configures the response indicator 190 to be presented in the view 500 proximate to the content 182. Accordingly, the view 500 can present to the user 170 the response indicator 190 when the user 170 is presented the view 500. In the case that the electronic message 180 is communicated to, and reviewed by, a plurality of recipients, response indicators selected for those participants also can be presented in the view proximate to the content 182. For example, a response indicator 520 selected for the user indicted by user identifier 512 can be presented proximate to the content 182.

In one non-limiting arrangement, optionally, the view 500 can present the user identifier 510 proximate to the response indicator 190. The user identifier 510 can indicate the user 160 for whom the response indicator 190 is selected. The user identifier 510 can be presented, for example, if there is more than one recipient of the electronic message 180. Accordingly, the user 170 can be appraised of the user 160 for whom the response indicator 190 is selected. If there is only one recipient of the electronic message 180, the user identifier 510 need not be, though can be, presented proximate to the response indicator 190.

Further, the view 500 can present to the user 160 the response indicator 190 when the user 160 is presented the view 500, although the various user identifiers can be changed accordingly to indicate who is sending and/or receiving the electronic message 180.

The electronic message 180 can be sent to, and reviewed by, a plurality of recipients. Thus, in addition to the response indicator 190, the view 500 also can present a respective response indicator 520 selected for one or more of the other recipients based on their determined sentiments when reviewing the content 182 of electronic message 180. The response indicator(s) 520 can be selected by respective sentiment analyzers executing on client devices used by such other recipients or by a sentiment analyzer executing on the electronic messaging server 110 and presented in a manner similar to that described for the response indicator 190.

Oftentimes a text message may be one of a plurality of text messages in a text messaging thread, and content of the plurality of text messages can be presented in the view 500. For example, in addition to the content 182, the view 500 can present content 530-1, 530-2, 530-3 of other text messages in the text messaging thread. Proximate to each content 530-1, 530-2, 530-3, the view 500 can present respective response indicators 540-1, 540-2, 550-1, 550-2, 560-1, 560-2 indicating the sentiments of users, who received the text messages and reviewed the content 530-1, 530-2, 530-3, toward the content 530-1, 530-2, 530-3. Optionally, user identifiers 510, 512, 514 can be presented proximate to the respective response indicators 540-1, 540-2, 550-1, 550-2, 560-1, 560-2 to indicate to which users the response indicators 540-1, 540-2, 550-1, 550-2, 560-1, 560-2 correspond.

Further, view can present respective response indicators 570, 580 proximate to user identifiers 510, 512 presented in a header (or footer) of the view 500. The response indicators 570, 580 can indicate respective summaries of the sentiments of the users, represented by the user identifiers 510, 512, toward the content 182, 530-1, 530-2 and 530-3, for example as previously described for the response indicator 190-1 of FIG. 3.

In an arrangement in which the electronic message 180 is a post to a social networking service or a web based forum, response indicators can be selected for sentiments of various users and presented in a corresponding view, for example in a manner similar to those described for FIGS. 3-5.

Figure 6:
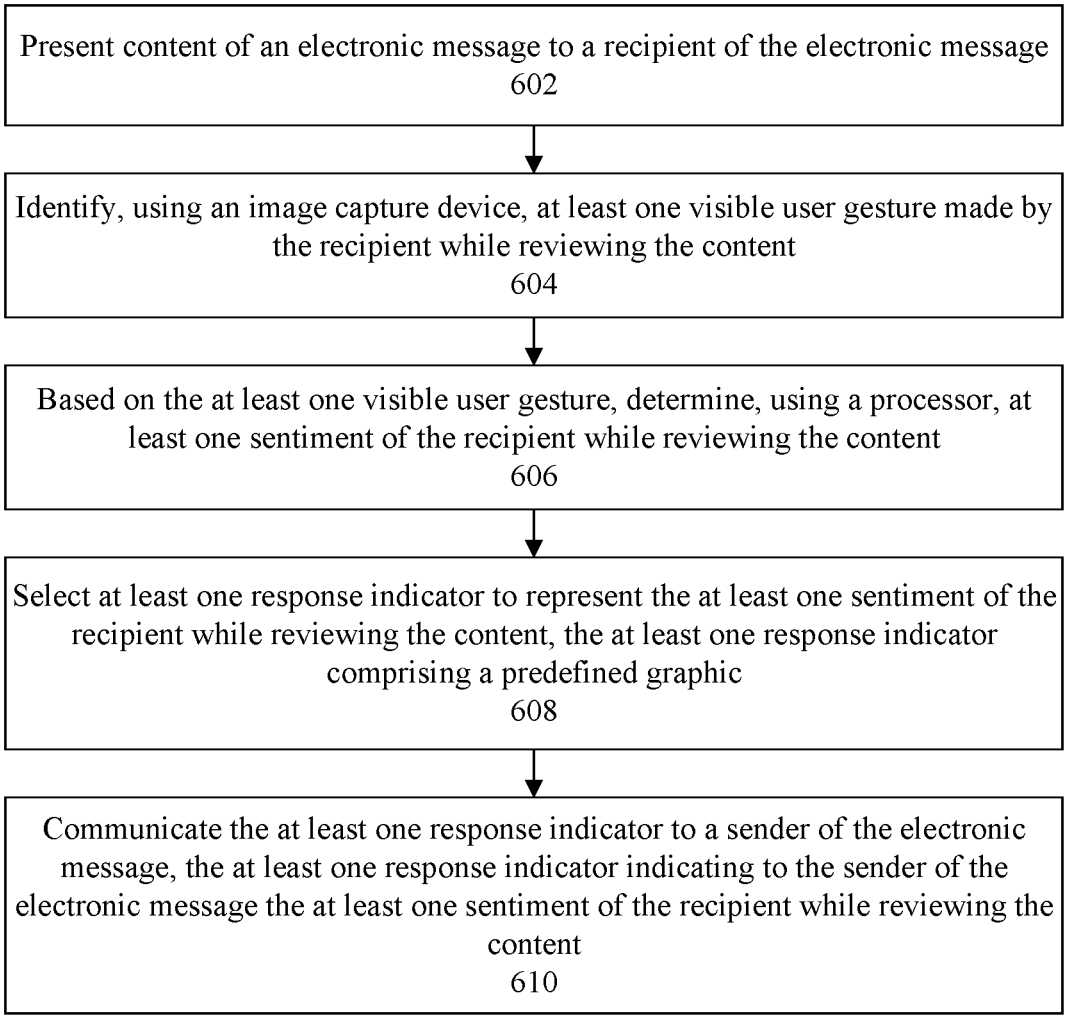
FIG. 6 is a flow chart illustrating an example of a method of communicating at least one response indicator to a sender of an electronic message.

FIG. 6 is a flow chart illustrating an example of a method 600 of communicating at least one response indicator to a sender of an electronic message. At step 602, the client messaging application 132 can present content 182 of an electronic message 180 to a recipient (e.g., user 160) of the electronic message 180. At step 604, the sentiment analyzer 138 can identify, using an image capture device, at least one visible user gesture made by the recipient while reviewing the content. In illustration, the sentiment analyzer 138 can process image data generated by the image capture device while capturing at least one image of the recipient.

At step 606, the sentiment analyzer 138 can, based on the at least one visible user gesture, determine, using a processor, at least one sentiment of the recipient while reviewing the content. At step 608, the sentiment analyzer 138 can select at least one response indicator to represent the at least one sentiment of the recipient while reviewing the content, the at least one response indicator comprising a predefined graphic. At step 610, the client messaging application 132 can communicate the at least one response indicator to a sender of the electronic message, the at least one response indicator indicating to the sender of the electronic message the at least one sentiment of the recipient while reviewing the content.

Figure 7:
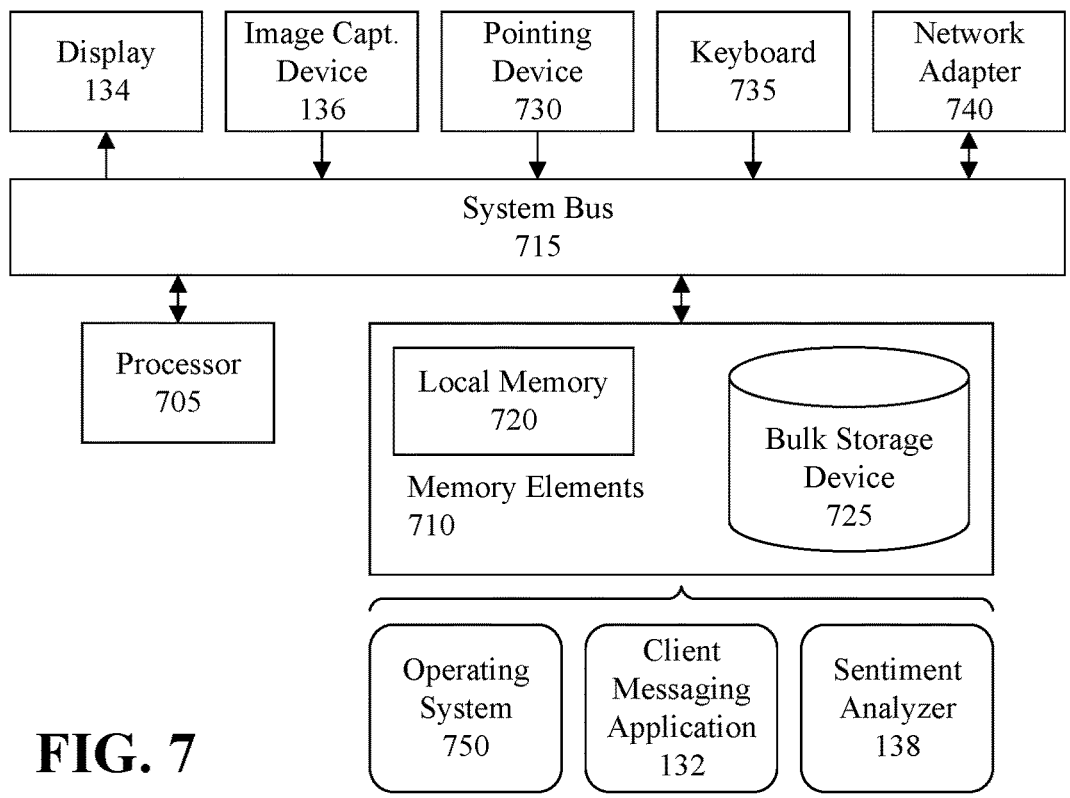
FIG. 7 is a block diagram illustrating example architecture for a client device.

FIG. 7 is a block diagram illustrating example architecture for the client device 130. The client device 140 can use a similar architecture. The client device 130 can include at least one processor 705 (e.g., a central processing unit) coupled to memory elements 710 through a system bus 715 or other suitable circuitry. As such, the client device 130 can store program code within the memory elements 710. The processor 705 can execute the program code accessed from the memory elements 710 via the system bus 715. It should be appreciated that the client device 130 can be implemented in the form of any system including a processor and memory that is capable of performing the functions and/or operations described within this specification. For example, the client device 130 can be implemented as a workstation, a desktop computer, a mobile computer, a tablet computer, a laptop computer, a netbook computer, a smart phone, a personal digital assistant, a set-top box, a gaming device, a network appliance, and so on.

The memory elements 710 can include one or more physical memory devices such as, for example, local memory 720 and one or more bulk storage devices 725. Local memory 720 refers to random access memory (RAM) or other non-persistent memory device(s) generally used during actual execution of the program code. The bulk storage device(s) 725 can be implemented as a hard disk drive (HDD), solid state drive (SSD), or other persistent data storage device. The client device 130 also can include one or more cache memories (not shown) that provide temporary storage of at least some program code in order to reduce the number of times program code must be retrieved from the bulk storage device 725 during execution.

Input/output (I/O) devices such as the display 134, the image capture device 136, a pointing device 730 and, optionally, a keyboard 735 can be coupled to the client device 130. The I/O devices can be coupled to the client device 130 either directly or through intervening I/O controllers. For example, the display 134 can be coupled to the client device 130 via a graphics processing unit (GPU), which may be a component of the processor 705 or a discrete device. One or more network adapters 740 also can be coupled to client device 130 to enable the client device 130 to become coupled to other systems, computer systems, remote printers, and/or remote storage devices through intervening private or public networks. Modems, cable modems, transceivers, and Ethernet cards are examples of different types of network adapters 740 that can be used with the client device 130.

As pictured in FIG. 7, the memory elements 710 can store the components of the client device 130, namely an operating system 750, the client messaging application 132 and, optionally, the sentiment analyzer 138. Being implemented in the form of executable program code, these components of the client device 130 can be executed by the client device 130 and, as such, can be considered part of the client device 130. Moreover, the operating system 750, the client messaging application 132 the sentiment analyzer 138 are functional data structures that impart functionality when employed as part of the client device 130. As noted, in another arrangement, the sentiment analyzer 138 can be a component of the electronic messaging server 110.

Figure 8:
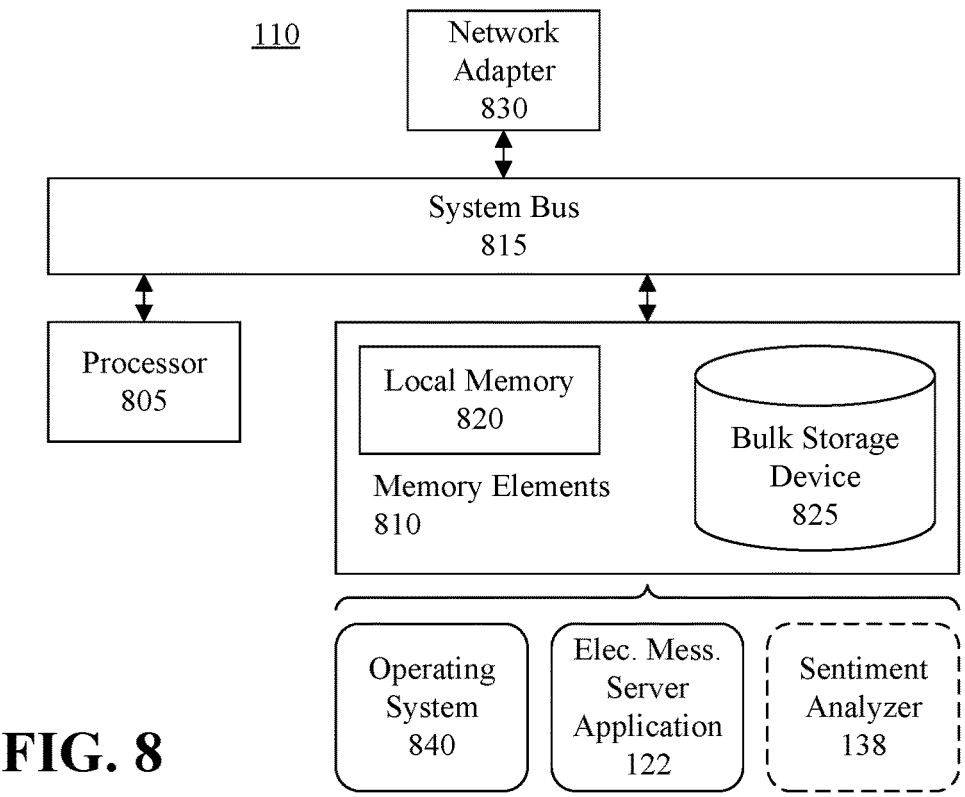
FIG. 8 is a block diagram illustrating example architecture for an electronic messaging server.

FIG. 8 is a block diagram illustrating example architecture for an electronic messaging server. The electronic messaging server 110 can include at least one processor 805 (e.g., a central processing unit) coupled to memory elements 810 through a system bus 815 or other suitable circuitry. As such, the electronic messaging server 110 can store program code within the memory elements 810. The processor 805 can execute the program code accessed from the memory elements 810 via the system bus 815. It should be appreciated that the electronic messaging server 110 can be implemented in the form of any system including a processor and memory that is capable of performing the functions and/or operations described within this specification. For example, the electronic messaging server 110 can be implemented as a server or a plurality of communicatively linked servers.

The memory elements 810 can include one or more physical memory devices such as, for example, local memory 820 and one or more bulk storage devices 825. The bulk storage device(s) 825 can be implemented as a HDD, SSD, or other persistent data storage device. The electronic messaging server 110 also can include one or more cache memories (not shown) that provide temporary storage of at least some program code in order to reduce the number of times program code must be retrieved from the bulk storage device 825 during execution.

One or more network adapters 830 can be coupled to electronic messaging server 110 to enable the electronic messaging server 110 to become coupled to other systems, computer systems, remote printers, and/or remote storage devices through intervening private or public networks. Modems, cable modems, transceivers, and Ethernet cards are examples of different types of network adapters 830 that can be used with the electronic messaging server 110.

As pictured in FIG. 8, the memory elements 810 can store the components of the electronic messaging server 110, namely an operating system 840 and the electronic messaging server application 122. In an arrangement in which the sentiment analyzer 138 is hosted by the electronic messaging server 110, the memory elements 810 also can store the sentiment analyzer 138. Being implemented in the form of executable program code, these components of the electronic messaging server 110 can be executed by the electronic messaging server 110 and, as such, can be considered part of the electronic messaging server 110. Moreover, the operating system 840, electronic messaging server application 122 and sentiment analyzer 138 are functional data structures that impart functionality when employed as part of the electronic messaging server 110.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As defined herein, the term "visible user gesture" means a gesture made by a person's body language that is identifiable by processing at least one image captured by an image capture device (e.g., a camera). As the term "visible user gesture" is defined herein, a person's selection of one or more keys and/or buttons on a keyboard is not a visible user gesture. As the term "visible user gesture" is defined herein, a person's movement of a pointing device (e.g., mouse) is not a visible user gesture. As the term "visible user gesture" is defined herein, a person's movement of an appendage (e.g., a finger) on a touchpad is not a visible user gesture. As the term "visible user gesture" is defined herein, a person's selection of one or more icons, buttons, menu items, etc. using a touchscreen is not a "visible user gesture."

As defined herein, the term "body language" means a type of non-verbal communication in which physical behavior, as opposed to words, are used to express or convey information. Such behavior includes facial expressions, body posture, appendage movement, eye movement and the use of space. As the term "body language" is defined herein, body language does not include a touch of a key or button of a keyboard, a touch of a mouse, a touch of a touchpad, a touch of a touchscreen, nor movement of an appendage detected by any device other than an image capture device.

As defined herein, the term "sentiment" means an attitude, thought and/or judgment of a person.

As defined herein, the term "response indicator" means an indicator that indicates a person's sentiment toward at least a portion of an electronic message.

As defined herein, the term "summary response indicator" means an indicator that indicates a summary of a person's sentiment toward an electronic message.

As defined herein, the term "predefined graphic" means a graphic element that is predefined. A predefined graphic can be, for example, an icon, emoji, emoticon or picture.

As defined herein, the term "proximate" means next to within a threshold distance, above within a threshold distance, or following within a threshold distance.

As defined herein, the term "electronic message" means a functional data structure, in the form of a message, configured to be communicated via at least one communication network, and including content configured to be presented to at least one user. Examples of an electronic message include an electronic mail (e-mail), a text message, a post in a social networking service, and a post in a web based forum.

As defined herein, the term "e-mail" means an electronic mail delivered via a communication network to at least one user. An e-mail may be sent by one user to one or more other users. In this regard, an e-mail typically identifies at least one recipient using a user name (e.g., e-mail address) corresponding to the recipient, or a group name corresponding to a group of recipients, in at least field within the e-mail, for example within a "To" field, "Cc" field and/or "Bcc" field in a header of the e-mail. A recipient may view an e-mail via an e-mail client, which may execute on a client device or a server to which a client device is communicatively linked.

As defined herein, the term "text message" means an electronic message comprising text delivered via a communication network to at least one user identified as a recipient. A text message may be sent by one user to one or more other users. In this regard, a text message typically identifies at least one recipient using a user name, user identifier, telephone number or the like. A text message also may comprise audio, image and/or multimedia content. A text message can be delivered, for example, using the short message service (SMS), the text messaging service (TMS) and/or the multimedia messaging service (MMS). A text message also may be referred to as an "instant message." As defined herein, a text message itself is not a result generated by an Internet search engine per se, although a text message may contain one or more uniform resource identifiers, such as hyperlinks, which can be generated by an Internet search engine and copied, for example by a user (e.g., sender), into the text message. In this regard, if a user uses a web browser to access an Internet search engine to perform an Internet search, and the user receives results from the Internet search engine in the web browser, such results are not a text message as the term text message is defined herein.

As defined herein, the term "post," when used as a verb, means to enter a message in a thread of a social networking service or a web based forum. A new thread can be created in which to enter the message, or the message can be entered into an existing thread.

As defined herein, the term "post," when used as a noun, means an electronic message posted to a thread of a social networking service or a web based forum.

As defined herein, the term "social networking service" means an online service platform on which social networks or social relations are built among people who, for example, share interests, activities, backgrounds or real-life connections, and via which people can share information with one another. People can hold conversations in a social networking service by posting messages. As the term "social networking service" is defined herein, a messaging service per se (e.g., an e-mail service, a text messaging service, or an instant messaging service) is not a social networking service, though a social networking service can include an e-mail messaging service, a text messaging service and/or an instant messaging service in addition to one or more social networking components.

As defined herein, the term "web based forum" means is an online discussion site where people can post messages that are viewable by other people. For example, people can hold conversations in a web based forum by posting messages. Some messages posted in a web based forum may be responses to other posted messages, or ask questions related to other posted messages. As the term "web based forum" is defined herein, a messaging service per se (e.g., an e-mail service, a text messaging service, or an instant messaging service) is not a web based forum, though a web based forum can include an e-mail messaging service, a text messaging service and/or an instant messaging service in addition to one or more web based forum components.

As defined herein, the term "electronic messaging server" means a processing system including at least one processor and memory that hosts at least one electronic messaging server application and shares services provided by the at least one electronic messaging server application with a plurality of client devices.

As defined herein, the term "client device" means a processing system including at least one processor and memory that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "plug-in" means a software component that adds one or more features to an existing application.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

As defined herein, the term "recipient" means a person (i.e., a human being).

As defined herein, the term "sender" means a person (i.e., a human being).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
presenting content of an electronic message to a recipient of the electronic message;
identifying, using a first image capture device, a first visible user gesture made by the first recipient while reviewing a first portion of the content of the electronic message and identifying, using the first image capture device, at least a second visible user gesture made by the first recipient while reviewing at least a second portion of the content of the electronic message;
based on the first visible user gesture, determining, using a processor, a first sentiment of the first recipient while reviewing the first portion of the content of the electronic message and determining a second sentiment of the first recipient while reviewing the second portion of the content of the electronic message;
selecting a first response indicator to represent the first sentiment of the first recipient while reviewing the first portion of the content of the electronic message, the first response indicator comprising a first predefined graphic, and selecting a second response indicator to represent the second sentiment of the first recipient while reviewing the second portion of the content of the electronic message, the second response indicator comprising a second predefined graphic; and
inserting into the electronic message the first response indicator and the second response indicator, and configuring the electronic message to present the first response indicator proximate to the first portion of the content of the electronic message for which the first sentiment is determined and configuring the electronic message to present the second response indicator proximate to the second portion of the content of the electronic message for which the second sentiment is determined.

2. The method of claim 1, further comprising:
inserting into the electronic message a first user identifier of the first recipient proximate to the first response indicator; and
inserting into the electronic message the first user identifier of the first recipient proximate to the second response indicator.

3. The method of claim 1, further comprising:
assigning a first sentiment value to the first sentiment;
assigning a second sentiment value to the second sentiment;
determining an average of at least the first and second sentiment values;
selecting predefined text corresponding to the average of the first and second sentiment values; and
inserting the predefined text into the electronic message.

4. The method of claim 1, further comprising:
assigning a first sentiment value to the first sentiment;
assigning a second sentiment value to the second sentiment;
assigning a third sentiment value to a third sentiment of a second recipient while reviewing the first portion of the content of the electronic message;
assigning a fourth sentiment value to a fourth sentiment of the second recipient while reviewing the first portion of the content of the electronic message;
determining an average of at least the first, second, third and fourth sentiment values;
selecting predefined text corresponding to the average of the first, second, third and fourth sentiment values; and
inserting the predefined text into the electronic message.

5. The method of claim 1, further comprising:
identifying, using a second image capture device, a third visible user gesture made by a second recipient while reviewing the first portion of the content of the electronic message and identifying, using the second image capture device, at least a fourth visible user gesture made by the second recipient while reviewing at least the second portion of the content of the electronic message;
based on the third visible user gesture, determining a third sentiment of the second recipient while reviewing the first portion of the content of the electronic message and determining a fourth sentiment of the second recipient while reviewing the second portion of the content of the electronic message;
selecting a third response indicator to represent the third sentiment of the second recipient while reviewing the first portion of the content of the electronic message, the third response indicator comprising a third predefined graphic, and selecting a fourth response indicator to represent the fourth sentiment of the second recipient while reviewing the second portion of the content of the electronic message, the second response indicator comprising a fourth predefined graphic; and
inserting into the electronic message the third response indicator and the fourth response indicator, and configuring the electronic message to present the third response indicator proximate to the first portion of the content of the electronic message for which the third sentiment is determined and configuring the electronic message to present the fourth response indicator proximate to the second portion of the content of the electronic message for which the fourth sentiment is determined.

6. The method of claim 5, further comprising:
assigning a first sentiment value to the first sentiment;
assigning a second sentiment value to the second sentiment;
assigning a third sentiment value to the third sentiment;
assigning a fourth sentiment value to the fourth sentiment;
determining an average of at least the first, second, third and fourth sentiment values;
selecting predefined text corresponding to the average of the first, second, third and fourth sentiment values; and
inserting the predefined text into the electronic message.

7. The method of claim 5, further comprising:
inserting into the electronic message a first user identifier of the first recipient proximate to the first response indicator;
inserting into the electronic message the first user identifier of the first recipient proximate to the second response indicator;
inserting into the electronic message a second user identifier of the second recipient proximate to the third response indicator; and
inserting into the electronic message the second user identifier of the second recipient proximate to the fourth response indicator.

8. A system, comprising:
a processor programmed to initiate executable operations comprising:
presenting content of an electronic message to a first recipient of the electronic message;
presenting content of an electronic message to a recipient of the electronic message;
identifying, using a first image capture device, a first visible user gesture made by the first recipient while reviewing a first portion of the content of the electronic message and identifying, using the first image capture device, at least a second visible user gesture made by the first recipient while reviewing at least a second portion of the content of the electronic message;
based on the first visible user gesture, determining a first sentiment of the first recipient while reviewing the first portion of the content of the electronic message and determining a second sentiment of the first recipient while reviewing the second portion of the content of the electronic message;
selecting a first response indicator to represent the first sentiment of the first recipient while reviewing the first portion of the content of the electronic message, the first response indicator comprising a first predefined graphic, and selecting a second response indicator to represent the second sentiment of the first recipient while reviewing the second portion of the content of the electronic message, the second response indicator comprising a second predefined graphic; and
inserting into the electronic message the first response indicator and the second response indicator, and configuring the electronic message to present the first response indicator proximate to the first portion of the content of the electronic message for which the first sentiment is determined and configuring the electronic message to present the second response indicator proximate to the second portion of the content of the electronic message for which the second sentiment is determined.

9. The system of claim 8, the executable operations further comprising:
inserting into the electronic message a first user identifier of the first recipient proximate to the first response indicator; and
inserting into the electronic message the first user identifier of the first recipient proximate to the second response indicator.

10. The system of claim 8, the executable operations further comprising:
assigning a first sentiment value to the first sentiment;
assigning a second sentiment value to the second sentiment;
determining an average of at least the first and second sentiment values;
selecting predefined text corresponding to the average of the first and second sentiment values; and
inserting the predefined text into the electronic message.

11. The system of claim 8, the executable operations further comprising:
assigning a first sentiment value to the first sentiment;
assigning a second sentiment value to the second sentiment;
assigning a third sentiment value to a third sentiment of a second recipient while reviewing the first portion of the content of the electronic message;
assigning a fourth sentiment value to a fourth sentiment of the second recipient while reviewing the first portion of the content of the electronic message;
determining an average of at least the first, second, third and fourth sentiment values;
selecting predefined text corresponding to the average of the first, second, third and fourth sentiment values; and
inserting the predefined text into the electronic message.

12. The system of claim 8, the executable operations further comprising:
identifying, using a second image capture device, a third visible user gesture made by a second recipient while reviewing the first portion of the content of the electronic message and identifying, using the second image capture device, at least a fourth visible user gesture made by the second recipient while reviewing at least the second portion of the content of the electronic message;

based on the third visible user gesture, determining a third sentiment of the second recipient while reviewing the first portion of the content of the electronic message and determining a fourth sentiment of the second recipient while reviewing the second portion of the content of the electronic message;

selecting a third response indicator to represent the third sentiment of the second recipient while reviewing the first portion of the content of the electronic message, the third response indicator comprising a third predefined graphic, and selecting a fourth response indicator to represent the fourth sentiment of the second recipient while reviewing the second portion of the content of the electronic message, the second response indicator comprising a fourth predefined graphic; and inserting into the electronic message the third response indicator and the fourth response indicator, and configuring the electronic message to present the third response indicator proximate to the first portion of the content of the electronic message for which the third sentiment is determined and configuring the electronic message to present the fourth response indicator proximate to the second portion of the content of the electronic message for which the fourth sentiment is determined.

13. The system of claim 12, the executable operations further comprising:
assigning a first sentiment value to the first sentiment;
assigning a second sentiment value to the second sentiment;
assigning a third sentiment value to the third sentiment;
assigning a fourth sentiment value to the fourth sentiment;
determining an average of at least the first, second, third and fourth sentiment values;
selecting predefined text corresponding to the average of the first, second, third and fourth sentiment values; and
inserting the predefined text into the electronic message.

14. The system of claim 12, the executable operations further comprising:
inserting into the electronic message a first user identifier of the first recipient proximate to the first response indicator;
inserting into the electronic message the first user identifier of the first recipient proximate to the second response indicator;
inserting into the electronic message a second user identifier of the second recipient proximate to the third response indicator; and
inserting into the electronic message the second user identifier of the second recipient proximate to the fourth response indicator.

15. A computer program product, comprising:
a computer readable storage medium having program code stored thereon, the program code executable by a data processing system to initiate operations including:
presenting content of an electronic message to a recipient of the electronic message;
identifying, using a first image capture device, a first visible user gesture made by the first recipient while reviewing a first portion of the content of the electronic message and identifying, using the first image capture device, at least a second visible user gesture made by the first recipient while reviewing at least a second portion of the content of the electronic message;

based on the first visible user gesture, determining a first sentiment of the first recipient while reviewing the first portion of the content of the electronic message and determining a second sentiment of the first recipient while reviewing the second portion of the content of the electronic message;

selecting a first response indicator to represent the first sentiment of the first recipient while reviewing the first portion of the content of the electronic message, the first response indicator comprising a first predefined graphic, and selecting a second response indicator to represent the second sentiment of the first recipient while reviewing the second portion of the content of the electronic message, the second response indicator comprising a second predefined graphic; and inserting into the electronic message the first response indicator and the second response indicator, and configuring the electronic message to present the first response indicator proximate to the first portion of the content of the electronic message for which the first sentiment is determined and configuring the electronic message to present the second response indicator proximate to the second portion of the content of the electronic message for which the second sentiment is determined.

16. The computer program product of claim 15, wherein the program code is executable by the data processing system to initiate operations further comprising:
inserting into the electronic message a first user identifier of the first recipient proximate to the first response indicator; and
inserting into the electronic message the first user identifier of the first recipient proximate to the second response indicator.

17. The computer program product of claim 15, wherein the program code is executable by the data processing system to initiate operations further comprising:
assigning a first sentiment value to the first sentiment;
assigning a second sentiment value to the second sentiment;
determining an average of at least the first and second sentiment values;
selecting predefined text corresponding to the average of the first and second sentiment values; and
inserting the predefined text into the electronic message.

18. The computer program product of claim 15, wherein the program code is executable by the data processing system to initiate operations further comprising:
assigning a first sentiment value to the first sentiment;
assigning a second sentiment value to the second sentiment;
assigning a third sentiment value to a third sentiment of a second recipient while reviewing the first portion of the content of the electronic message;
assigning a fourth sentiment value to a fourth sentiment of the second recipient while reviewing the first portion of the content of the electronic message;
determining an average of at least the first, second, third and fourth sentiment values;
selecting predefined text corresponding to the average of the first, second, third and fourth sentiment values; and
inserting the predefined text into the electronic message.

19. The computer program product of claim 15, wherein the program code is executable by the data processing system to initiate operations further comprising:
identifying, using a second image capture device, a third visible user gesture made by a second recipient while reviewing the first portion of the content of the electronic message and identifying, using the second image capture device, at least a fourth visible user gesture made by the second recipient while reviewing at least the second portion of the content of the electronic message;

based on the third visible user gesture, determining a third sentiment of the second recipient while reviewing the first portion of the content of the electronic message and determining a fourth sentiment of the second recipient while reviewing the second portion of the content of the electronic message;

selecting a third response indicator to represent the third sentiment of the second recipient while reviewing the first portion of the content of the electronic message, the third response indicator comprising a third predefined graphic, and selecting a fourth response indicator to represent the fourth sentiment of the second recipient while reviewing the second portion of the content of the electronic message, the second response indicator comprising a fourth predefined graphic; and inserting into the electronic message the third response indicator and the fourth response indicator, and configuring the electronic message to present the third response indicator proximate to the first portion of the content of the electronic message for which the third sentiment is determined and configuring the electronic message to present the fourth response indicator proximate to the second portion of the content of the electronic message for which the fourth sentiment is determined.

20. The computer program product of claim 19, wherein the program code is executable by the data processing system to initiate operations further comprising:

assigning a first sentiment value to the first sentiment;
assigning a second sentiment value to the second sentiment;
assigning a third sentiment value to the third sentiment;
assigning a fourth sentiment value to the fourth sentiment;
determining an average of at least the first, second, third and fourth sentiment values;
selecting predefined text corresponding to the average of the first, second, third and fourth sentiment values; and
inserting the predefined text into the electronic message.

\* \* \* \* \*